United States Patent
Chin et al.

(10) Patent No.: US 7,748,668 B2
(45) Date of Patent: Jul. 6, 2010

(54) ELECTRONIC DEVICE WITH AN ELEVATING MECHANISM

(75) Inventors: Chung-Hsien Chin, Taipei (TW); Cho-Keng Wu, Taipei County (TW)

(73) Assignee: BenQ Corporation, Taipei (TW)

( * ) Notice: Subject to any disclaimer, the term of this patent is extended or adjusted under 35 U.S.C. 154(b) by 311 days.

(21) Appl. No.: 11/840,218

(22) Filed: Aug. 17, 2007

(65) Prior Publication Data
US 2008/0237556 A1 Oct. 2, 2008

(30) Foreign Application Priority Data
Mar. 26, 2007 (TW) .............................. 96110372 A (51) Int. Cl.
*F16M 11/00* (2006.01)

(52) U.S. Cl. ..................................................... 248/161

(58) Field of Classification Search .......... 284/102–106
See application file for complete search history.

(56) References Cited
U.S. PATENT DOCUMENTS
3,543,282 A * 11/1970 Lucien ..................... 108/147

| | | | |
|---|---|---|---|
| 4,616,218 A * | 10/1986 | Bailey et al. ........... | 361/679.21 |
| 4,690,362 A * | 9/1987 | Helgeland .............. | 248/404 |
| 7,227,598 B2 * | 6/2007 | Chin ........................ | 349/60 |
| 2005/0236533 A1 | 10/2005 | McRight et al. | |
| 2007/0182878 A1 * | 8/2007 | Chin ........................ | 349/58 |

* cited by examiner

*Primary Examiner*—J. Allen Shriver, II
*Assistant Examiner*—Erin Smith (57) ABSTRACT

An electronic device with an elevating mechanism includes a body and the elevating mechanism connected with the body. The elevating mechanism includes a support base, an elevating element, and a fastening element. The elevating element capable of moving between a first position and a second position relative to the support base is connected with both the support base and the body. The elevating element includes a first wedging component. The fastening element disposed around the second position relative to the support base is rotatable between a third position and a fourth position. The fastening element includes a second wedging component. When the fastening element is rotated to the fourth position, the second wedging component is wedged on the first wedging component for fastening the elevating element at the second position.

14 Claims, 10 Drawing Sheets

ELECTRONIC DEVICE WITH AN ELEVATING MECHANISM

BACKGROUND OF THE INVENTION

1. Field of the Invention

The present invention relates to an electronic device, and more particularly, to an electronic device with an elevating mechanism.

2. Description of the Prior Art

Figure 1:
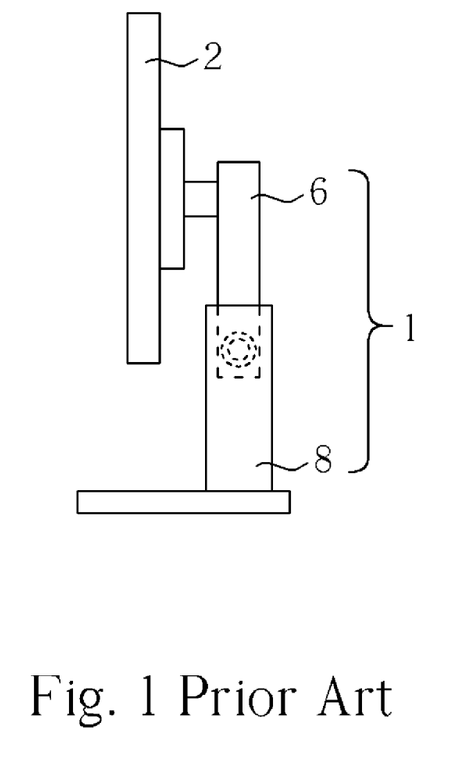
FIG. 1 is a lateral diagram of a body of a conventional display being disposed on an elevating mechanism in the prior art.
Figure 2:
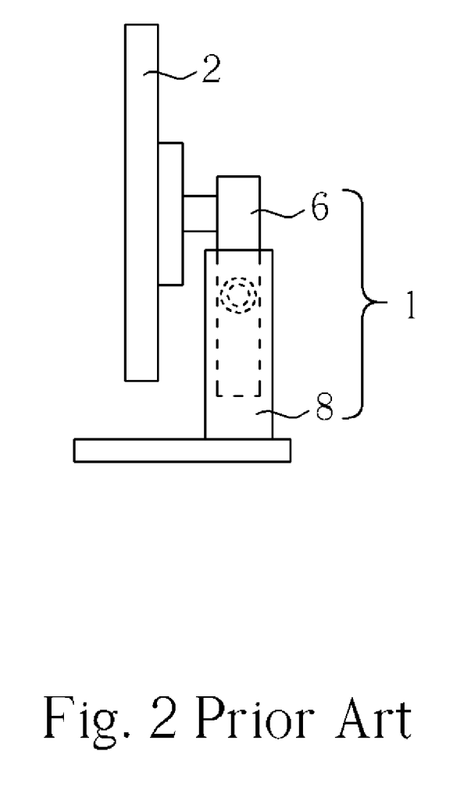
FIG. 2 is a lateral diagram illustrating the body shown in FIG. 1 lowered to a second position with the elevating mechanism shown in FIG. 1.

A conventional electronic device capable of elevating is connected to an elevating mechanism for facilitating a user to adjust a height of a body of the electronic device. Please refer to FIG. 1 and FIG. 2, and take a display capable of elevating and its screen as an example. FIG. 1 is a lateral diagram of a body 2 of a conventional display being disposed on an elevating mechanism 1 in the prior art. The body 2 indicates the screen of the conventional display. The elevating mechanism 1 at least includes an elevating element 6 and a support base 8. The elevating element 6 connects to both the support base 8 and the body 2. The body 2 is elevated to a first position of the support base 8, i.e. a highest position of the body 2, with the elevating mechanism 1. FIG. 2 is a lateral diagram illustrating the body 2 shown in FIG. 1 lowered to a second position of the support base 8, i.e. a lowest position of the body 2, with the elevating mechanism 1.

Figure 3:
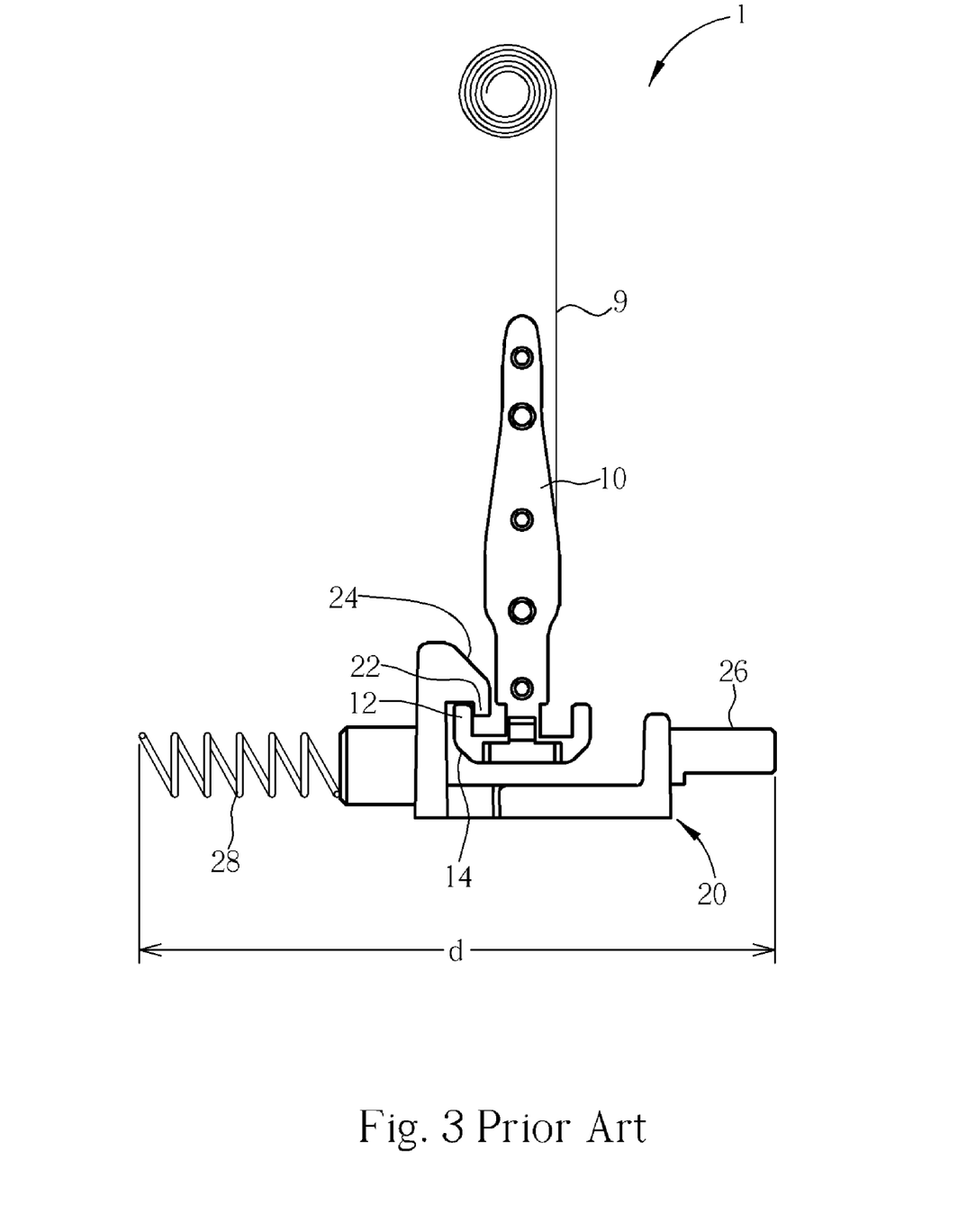
FIG. 3 is a lateral diagram of the elevating mechanism shown in both FIG. 1 and FIG. 2.

FIG. 3 is a lateral diagram of the elevating mechanism 1 shown in both FIG. 1 and FIG. 2. The elevating mechanism 1 further includes a rolled spring 9, a press switch 20, a spring 28, and an elevator 10. The rolled spring 9 is disposed at the top of the support base 8. The spring 28 is disposed at the bottom of the support base 8. The elevator 10 is disposed within the elevating element 6 and connected to the rolled spring 9. The elevator 10 is moved by expanding or contracting the rolled spring 9 so that the height of the body 2 shown in FIG. 1 may be adjusted. In FIG. 3, the rolled spring 9 is expanded. The elevator 10 includes a clasp 12, while the press switch 20 includes a clasp 22 as well. With the engagement between the clasps 12 and 22, the body 2 is fixed at the second position shown in FIG. 2, i.e., the lowest position of the body 2.

Figure 4:
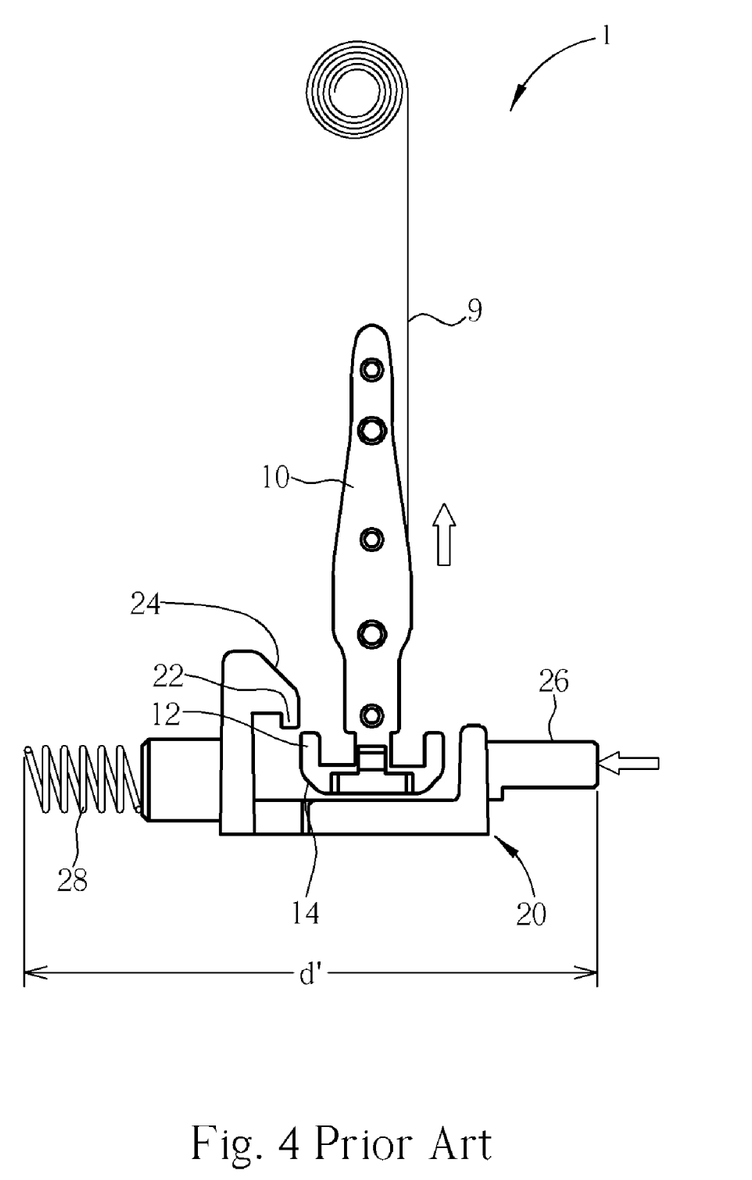
FIG. 4 is a lateral diagram of illustrating how the elevator of the elevating element shown in FIG. 3 is released.

FIG. 4 is a lateral diagram of illustrating how the elevator 10 of the elevating element 6 shown in FIG. 3 is released. When the height of the body 2 is to be elevated so that the body 2 is moved from the second position shown in FIG. 2 to the first position shown in FIG. 1, as shown in FIG. 4, a user would push the elevating element 6 downwards so that the elevator 10 is moved downwards as well. Then the button 26 is pressed for compressing the spring 28 so that the clasp 22 of the press switch 20 is detached from the clasp 12 of the elevator 10. At this time, the elevator 10 along with the elevating element 6 is elevated upwards with an elastic force of the rolled spring 9 so that the height of the body 2 is raised to the highest position shown in FIG. 1.

When the user would like to lower the height of the body 2 from the highest position shown in FIG. 1 to the lowest position shown in FIG. 2, the elevating element 6 merely has to be pushed downwards until a ramp 14 of the elevator 10 touches and pushes a ramp 24 of the press switch 20. While the elevating element 6 is pushed downwards, with the aids of the ramps 14 and 24, the spring 28 is compressed leftwards by the press switch 20 until the clasp 12 of the elevator 10 is lower than the clasp 22 of the press switch 20. Since the press switch 20 is pushed by a rightward elastic force from the spring 28, the clasp 22 of the press switch 20 may be engaged with the clasp 12 of the elevator 10 as shown in FIG. 3 so that the elevating element 6 is located back to a lowest position as shown in FIG. 2. Therefore, the lowest position of the body 2 is fixed as shown in FIG. 2 for reducing its volume during transportation.

Please refer to FIG. 1, FIG. 2, FIG. 3, and FIG. 4 again. Since the elevating mechanism 1 is fastened by the press switch 20, when the elevator 10 is to be released, the spring 28 is compressed first and restored later. It indicates a fact that a distance d' for disposing the press switch 20 with the compressed spring 28, as shown in FIG. 4, is shorter than a distance d for disposing that with the restored spring 28 on the support base 6, as shown in FIG. 3. According to descriptions above, the press switch 20 requires many parts, and the support base 6 is required to provide larger room for containing both the press switch 20 and the spring 28.

SUMMARY OF THE INVENTION

The claimed invention discloses an elevating mechanism. The elevating mechanism comprises a support base, an elevating element, and a fastening element. The elevating element is connected to the support base and capable of moving relative to the support base between a first position and a second position. The elevating element has a first wedging component. The fastening element is disposed on the support base, located near the second position, and capable of rotating relative to the support base between a third position and a fourth position. The fastening element has a second wedging component. When the fastening element is rotated to the fourth position, the second wedging component is wedged on the first wedging component for fastening the elevating element at the second position.

The claimed invention discloses an electronic device with an elevating mechanism. The electronic device comprises a body and an elevating mechanism connected to the body. The elevating mechanism comprises a support base, an elevating element, and a fastening element. The elevating element is connected to both the support base and the body. The elevating element is capable of moving relative to the support base between a first position and a second position. The elevating element has a first wedging component. The fastening element is disposed on the support base and located near the second position. The fastening element is capable of rotating relative to the support base between a third position and a fourth position. The fastening element has a second wedging component. When the fastening element is rotated to the fourth position, the second wedging component is wedged on the first wedging component for fastening the elevating element at the second position.

These and other objectives of the present invention will no doubt become obvious to those of ordinary skill in the art after reading the following detailed description of the preferred embodiment that is illustrated in the various figures and drawings.

DETAILED DESCRIPTION

In the present invention an elevating mechanism having a rotational fastening element is disclosed for reducing an amount of parts and saving room provided by the support base.

Figure 5:
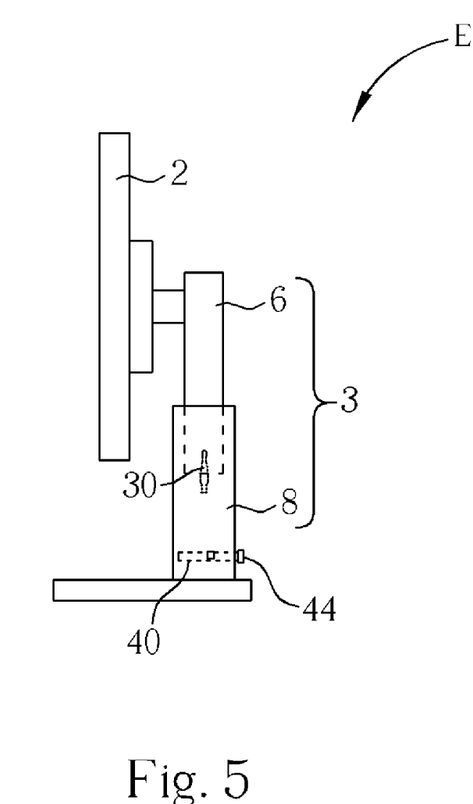
FIG. 5 is a lateral diagram of illustrating the body of an electronic device is elevated to a first position with the aid of an elevating mechanism of the present invention.
Figure 6:
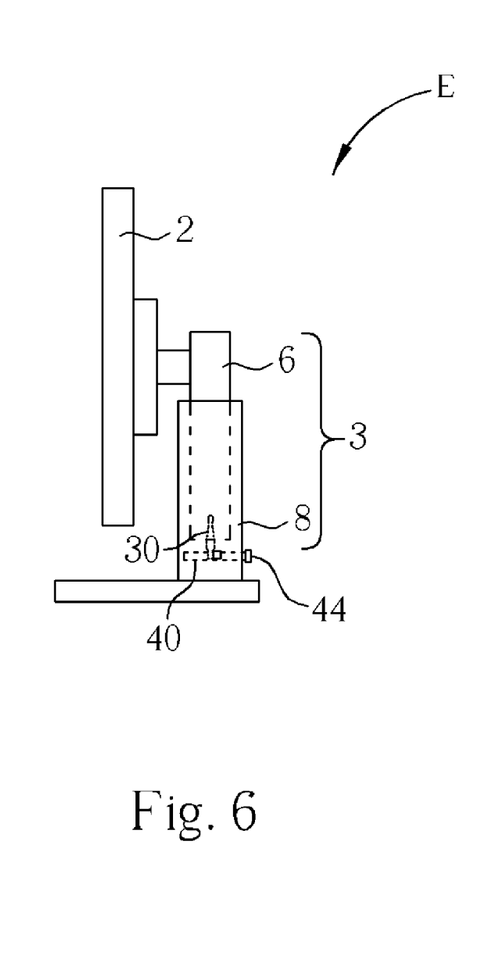
FIG. 6 is a lateral diagram of illustrating the body of the electronic device shown in FIG. 5 is lowered to a second position with the aid of the elevating mechanism of the present invention.

FIG. 5 is a lateral diagram of illustrating the body 2 of an electronic device E is elevated to a first position of the support base 8, i.e. a highest position of the body 2, with the aid of an elevating mechanism 3 of the present invention. FIG. 6 is a lateral diagram of illustrating the body 2 of the electronic device E shown in FIG. 5 is lowered to a second position of the support base 8, i.e. a lowest position of the body 2, with the aid of the elevating mechanism 3 of the present invention. The electronic device E may be a display capable of elevating, where the body 2 is a screen of the display. The elevating mechanism 3 at least includes a rolled spring, which is the same with the rolled spring 9 shown in FIG. 3, the elevating element 6, and the support base 8, where the disposition between these elements are the same with the prior art so as not to be described further.

Figure 7:
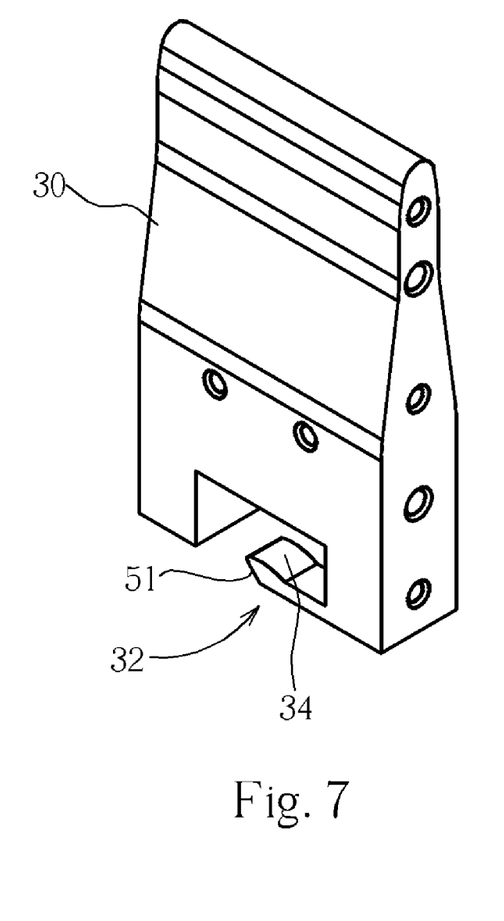
FIG. 7 is a detailed diagram of the elevator of the elevating element in the elevating mechanism in the present invention.

A largest difference between the elevating mechanism 3 of the present invention and the elevating mechanism of the prior art lies in an elevator 30 of the elevating element 6 and a fastening element 40. Please refer to FIG. 7, which is a detailed diagram of the elevator 30 in the elevating mechanism 3 in the present invention. The elevator 30 includes a first wedging component 32, which has a first cambered surface 34 and a ramp 51. The elevator 30 is utilized for moving the body 2 to the first position of the support base 8, i.e. the highest position of the body 2 shown in FIG. 5, or to the second position of the support base 8, i.e. the lowest position of the body 2 shown in FIG. 6.

Figure 8:
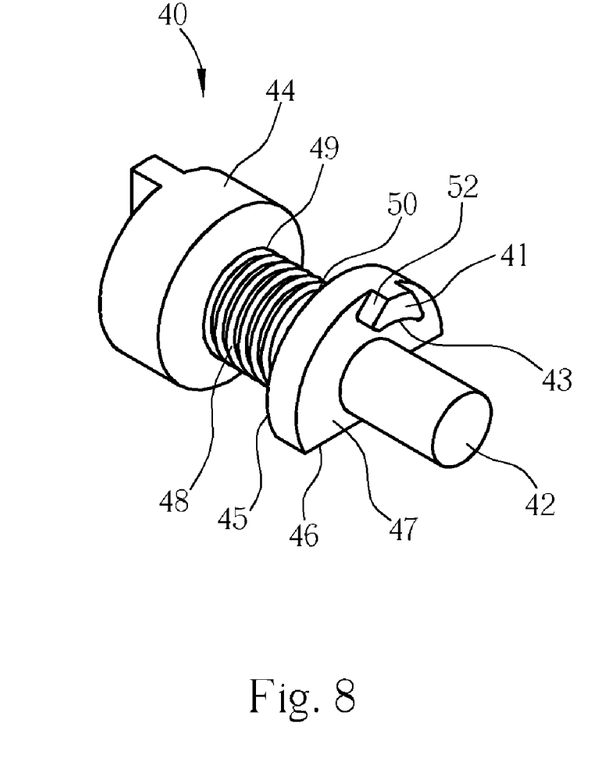
FIG. 8 is a detailed diagram of the fastening element in the elevating mechanism of the present invention.

Please refer to FIG. 8, which is a detailed diagram of the fastening element 40 in the elevating mechanism 3 of the present invention. The fastening element 40 is disposed near the second position of the support base 8 in a rotatable manner, where the fastening element 40 includes a pivot 42 and a cam 46. The cam 46 is disposed on the pivot 42, and has a first side 45 and a second side 47. In a preferred embodiment of the present invention, the second side 47 is closer to the body 2 than the first side 45, where the first side 45 is at the reverse side of the second side 47. The handle 44 is preferably disposed at one terminal of the pivot and exposed outside the support base 8 for facilitating a user to rotate the fastening element 40 by rotating the handle 44, as described in FIG. 5 and FIG. 6. In the preferred embodiment of the present invention, a second wedging component 41 is disposed at the second side 47 of the cam 46, where the second wedging component 41 has a second cambered surface 43 and a ramp 52. The second wedging component 41 is utilized for engaging with the first wedging component 32 of the elevator 30 so that the elevator 30 is fastened, and related details are described in FIG. 9 and FIG. 10. Furthermore, a twist force device 48, such as a twist spring, is preferably disposed between the handle 44 and the cam 46. The twist force device 48 has a first terminal 49 and a second terminal 50, where the first terminal 49 may be fixed at the support base 8, and the second terminal 50 may be fixed at the first side 45 of the cam 46 or be fixed on the pivot 42.

Note that the second wedging component 41 and the twist force device 48 may be disposed interchangeably. In another embodiment of the present invention, the second wedging component 41 is disposed at the first side 45 of the cam 46, the first terminal 49 of the twist force device 48 is disposed at the second side 47 of the cam 46, and the second terminal 50 of the twist force device 48 is fixed at the support base 8. The embodiment of the present invention may be easily implemented according to the abovementioned descriptions so that further diagrams are not illustrated.

Figure 9:
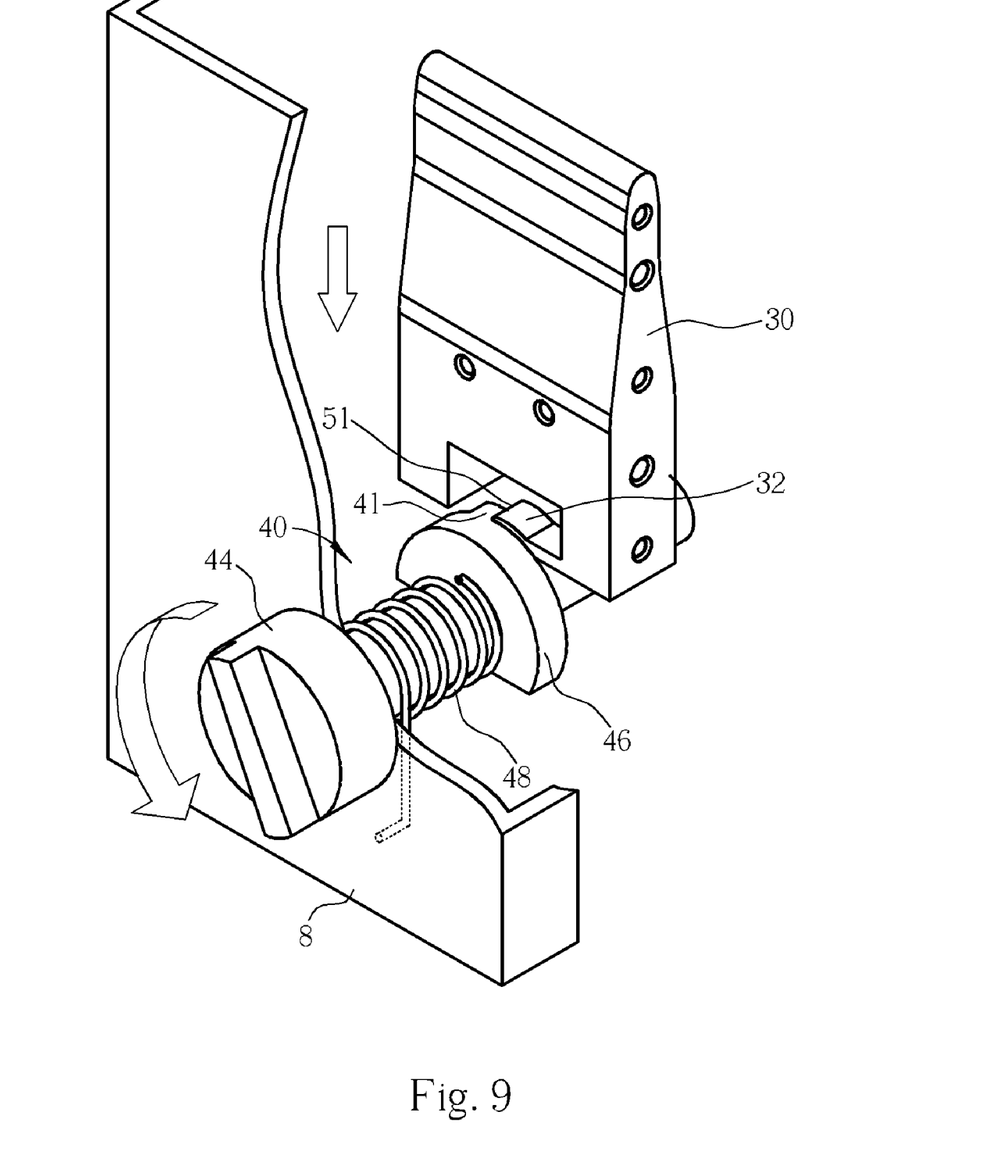
FIG. 9 and FIG. 10 are diagrams of illustrating how the elevator of the elevating element in the present invention is engaged with the fastening element.
Figure 10:
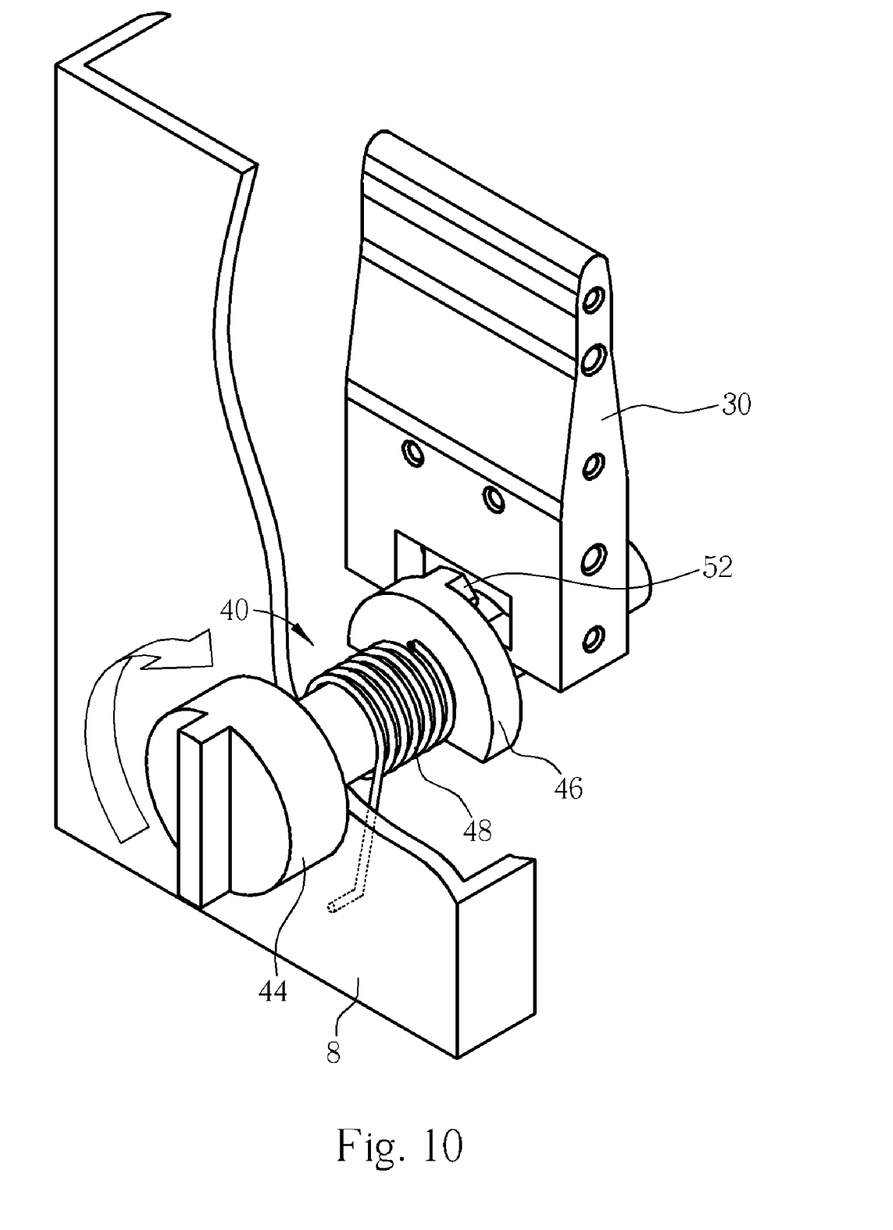

Please refer to FIG. 9 and FIG. 10, both of which are diagrams of illustrating how the elevator 30 of the elevating element 6 is engaged with the fastening element 40. When a user would like to lower the body 2 to the lowest position as shown in FIG. 6, the user has to push the elevating element 6 downwards. While the elevating element 6 is lowered, the ramp 51, which is covered in FIG. 10, of the first wedging component 32 pushes the ramp 52, which is covered in FIG. 9, of the second wedging component 41 so that the fastening element 40 is rotated to a third position as shown in FIG. 9. At this time, the twist force device 48 is stretched until the first wedging component 32 is lower than the second wedging component 41. Hereafter, the fastening element 40 is rotated to a fourth position as shown in FIG. 10 with an elastic force (or a twist force) of the twist force device 48, and the first cambered surface 34 resists against the second cambered surface 43 for engaging the first wedging component 32 to the second wedging component 41. According to descriptions above, when the height of the body 2 is required to be elevated, the user may merely rotate the handle 44 in a counterclockwise manner for releasing the elevator 30 of the elevating element 6.

Note that the elevating mechanism 3 of the present invention preferably includes the twist force device 48 for adjusting the height of the body 2. Even if the twist force device 48 is not disposed in the elevating mechanism 3 of the present invention, the user may still release or engage the elevator 30 of the elevating element 6 by rotating the fastening element 40 between the third position 30 shown in FIG. 9 and the fourth position shown in FIG. 10, and the aim of the present invention may still be achieved.

Compared to the elevating mechanism of the prior art, the elevating mechanism of the present invention utilizes fewer parts for solving the defect of providing larger room for containing the elevating mechanism in the prior art.

Those skilled in the art will readily observe that numerous modifications and alterations of the device and method may be made while retaining the teachings of the invention.

What is claimed is:

1. An elevating mechanism comprising:
   a support base;
   an elevating element connected to the support base and capable of moving relative to the support base between a first position and a second position, the elevating element having a first wedging component; and
   a fastening element, disposed on the support base, located near the second position, and capable of rotating relative to the support base between a third position and a fourth position, the fastening element having a second wedging component, the fastening element comprising:
- a pivot disposed on the support base; and
- a cam disposed on the pivot, the cam having a first side and a second side, the second wedging element disposed at the first side or the second side of the cam;

wherein when the fastening element is rotated to the fourth position, the second wedging component is wedged on the first wedging component for fastening the elevating element at the second position.

2. The elevating mechanism of claim 1 wherein the fastening element further comprises a handle disposed at one terminal of the pivot for rotating the pivot.

3. The elevating mechanism of claim 1 wherein the fastening element further comprises:
- a twist force device having a first terminal and a second terminal, the second terminal of the twist force device fastened on the first side of the cam, the first terminal of the twist force device fastened on the support base.

4. The elevating mechanism of claim 3 wherein the twist force device is a twist spring.

5. The elevating mechanism of claim 1 wherein the fastening element further comprises:
- a twist force device having a first terminal and a second terminal, the first terminal of the twist force device fastened at the second side of the cam, the second terminal of the twist force device fastened on the support base.

6. The elevating mechanism of claim 5 wherein the twist force device is a twist spring.

7. The elevating mechanism of claim 1 wherein the first wedging component comprises a first cambered surface; wherein the second wedging component comprises a second cambered surface corresponding to the first cambered surface; wherein when the elevating element is located at the second position, the first cambered surface resists against the second cambered surface.

8. An electronic device with an elevating mechanism comprising:
- a body; and
- an elevating mechanism connected to the body, the elevating mechanism comprising:
  - a support base;
  - an elevating element connected to both the support base and the body, the elevating element capable of moving relative to the support base between a first position and a second position, the elevating element having a first wedging component; and
  - a fastening element disposed on the support base and located near the second position, the fastening element capable of rotating relative to the support base between a third position and a fourth position, the fastening element having a second wedging component, the fastening element comprising:
    - a pivot disposed on the support base; and
    - a cam disposed on the pivot, the cam having a first side and a second side, the second wedging element disposed at the first side or the second side of the cam;
  - wherein when the fastening element is rotated to the fourth position, the second wedging component is wedged on the first wedging component for fastening the elevating element at the second position.

9. The electronic device of claim 8 wherein the fastening element further comprises a handle disposed at one terminal of the pivot for rotating the pivot.

10. The electronic device of claim 8 wherein the fastening component further comprises:
- a twist force device having a first terminal and a second terminal, the second terminal of the twist force device fastened at the first side of the cam, the first terminal of the twist force device fastened on the support base.

11. The electronic device of claim 10 wherein the twist force device is a twist spring.

12. The electronic device of claim 8 wherein the fastening element further comprises:
- a twist force device having a first terminal and a second terminal, the first terminal of the twist force device fastened at the second side of the cam, the second terminal of the twist force device fastened on the support base.

13. The electronic device of claim 12 wherein the twist force device is a twist spring.

14. The electronic device of claim 8 wherein the first wedging component has a first cambered surface, the second wedging component has a second cambered surface corresponding to the first cambered surface; wherein when the elevating element is located at the second position, the first cambered surface resists against the second cambered surface.

* * * * *